Patented Aug. 6, 1929.

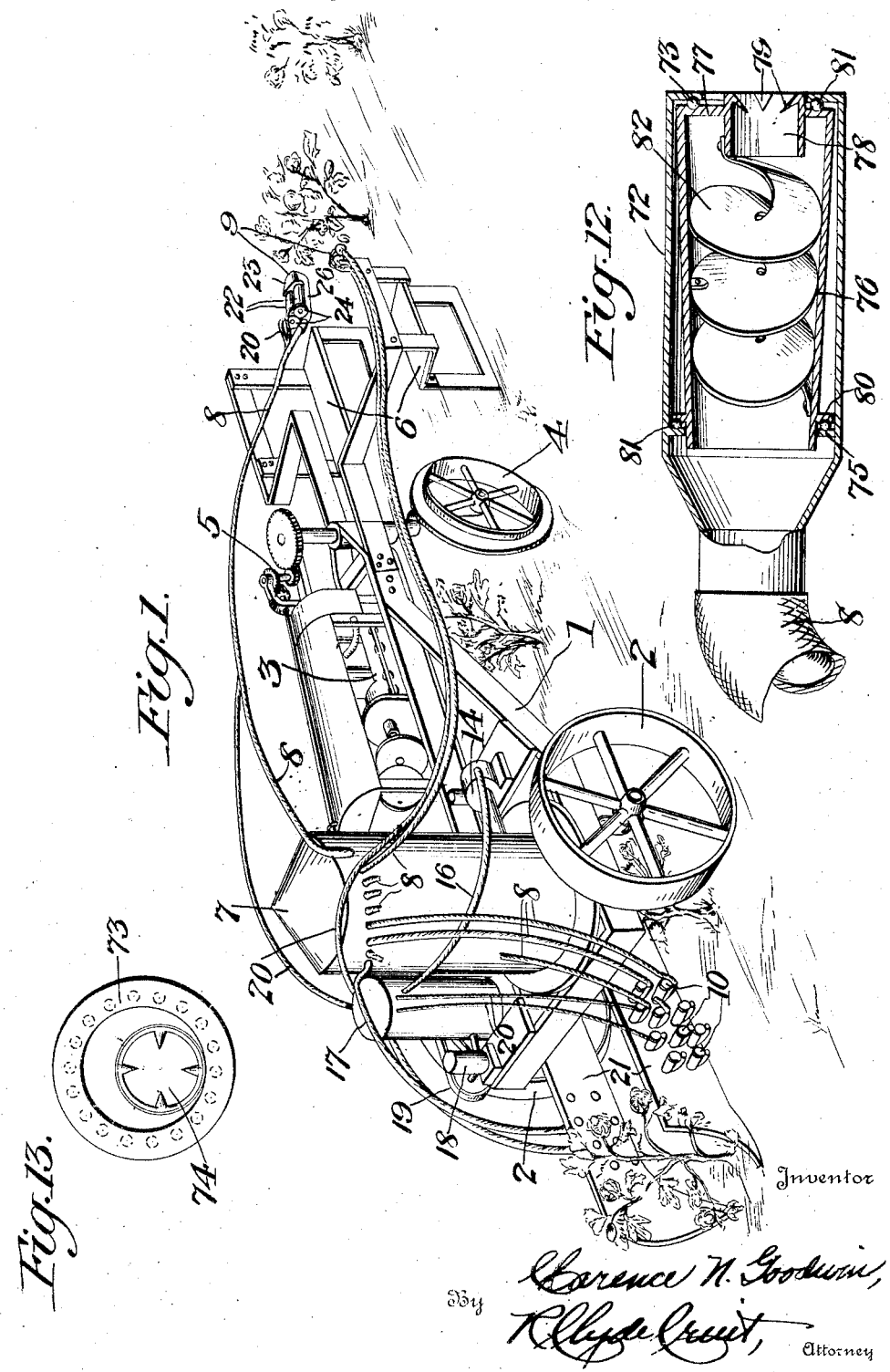

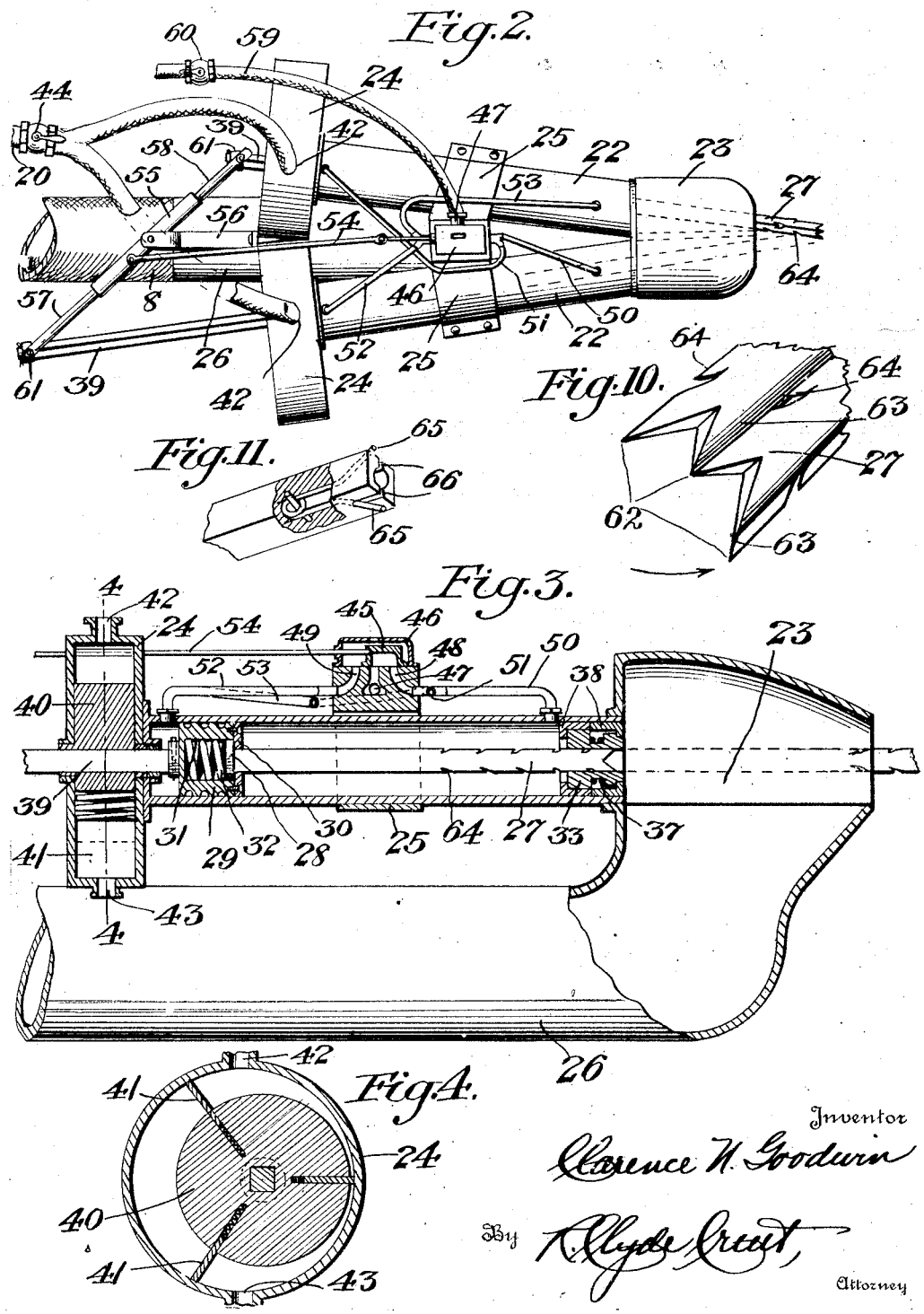

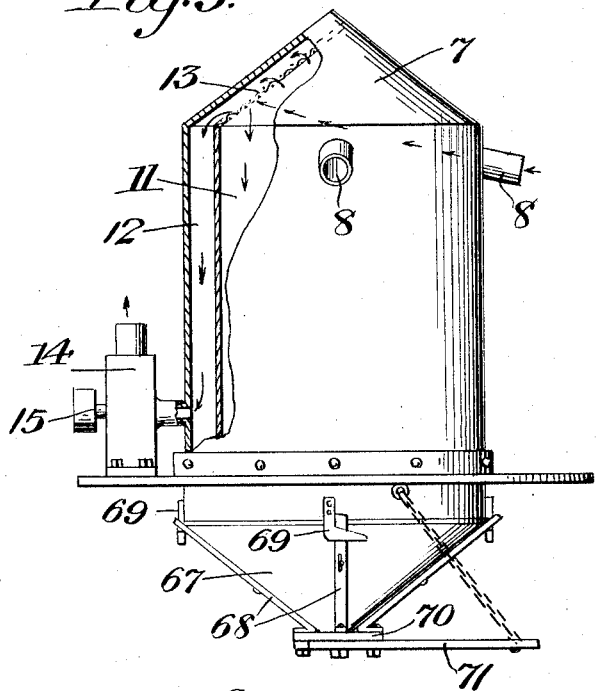
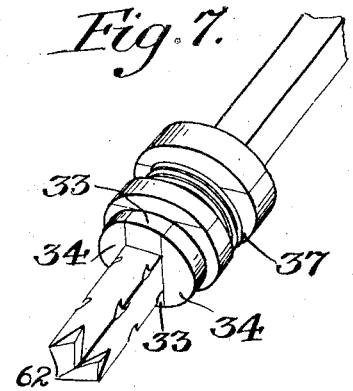
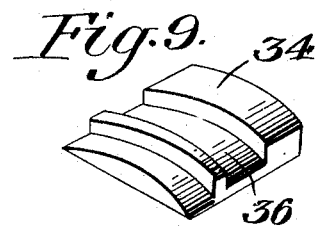
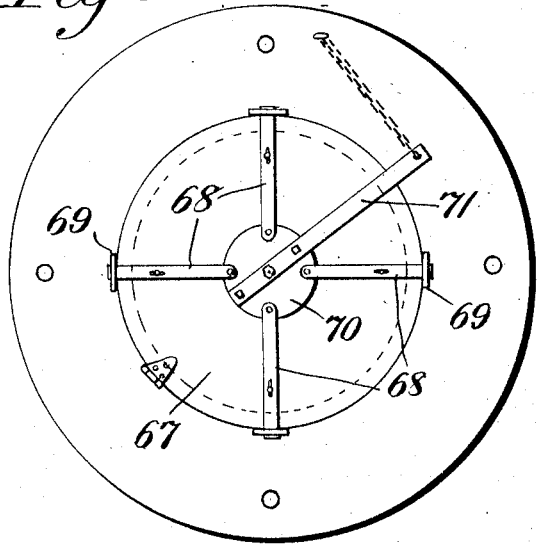

1,723,151

UNITED STATES PATENT OFFICE.

CLARENCE N. GOODWIN, OF RALEIGH, NORTH CAROLINA.

COTTON-HARVESTING MACHINE.

Application filed November 22, 1921. Serial No. 516,990.

This invention relates to certain improvements in cotton harvesting machines and particularly to an apparatus whereby certain of the pickers are arranged in fixed position for engagement with the cotton bolls and the others connected for manual or hand direction, both types of pickers, however, being automatically operated by compressed air.

The principal object of the invention is the provision of a combined automatically and manually controlled machine of the type indicated, whereby the pickers associated with said machine are operated by compressed air, and the operation of assisting the stripping of the cotton and the conveying of the same from the pickers to the storage receptacle carried by said machine, is performed by air suction, the air compressing and suction apparatus being carried and operated by the machine, the whole comprising a single, self-propelled, portable unit, capable of performing the maximum amount of work with the minimum amount of labor.

Another object is to provide a picker, to be used in conjunction with said machine, of the combined continuous reciprocating and rotary type, with means for independently regulating both the reciprocatory and rotary movements thereof relative to each other.

Another object is to produce a preferred form of picker that will be double acting in its operation, comprising two needles or picker fingers alternately advancing and retracting, and simultaneously rotating, with means for performing this coordinating action continuously.

The invention also contemplates means whereby the picked cotton may be periodically discharged from the storage receptacle mounted on the machine, at any desired location or period of time as desired and found necessary.

These and other objects of the invention will be apparent upon referring to the following specification in conjunction with the accompanying drawings illustrating the preferred embodiment of the invention.

Generally stated, the invention comprises a self-propelled machine having mounted thereon an air compressor, including an air storage tank and a cotton receiving receptacle and associated air exhauster, said air compressor and exhauster adapted to be driven by the main power plant of the machine in any preferred manner.

Supported by, and projecting outwardly from the forward end of the machine, are two oppositely disposed, parallel guides or deflecting wings, slightly flared and properly spaced apart to straddle a row of cotton plants to elevate the lowermost cotton bolls and bring all of said bolls in proper position to be engaged by a series of picker units mounted in the vertical sides of said guide or deflector, each of said units comprising automatically operated combined rotary and reciprocating picker fingers, the detail construction of which will be hereinafter more fully described.

The rear of the machine is provided with one or more platforms or steps arranged to pass each side of the cotton plants, during the operation of the apparatus, said platforms being adapted to carry one or more men for directing, preferably two, pickers, these manually directed pickers involving the same manner of construction and operation as the mechanical pickers hereinbefore referred to.

With this combined arrangement of mechanical and hand pickers, any unpicked cotton that escapes said mechanical pickers can be recovered by the manually directed pickers, so that a complete and thorough harvesting of the field is assured.

In the drawings,

Fig. 1 is a perspective view, showing the various parts in assembled and operative position;

Fig. 2 illustrates in plan the preferred form of picker;

Fig. 3 is a longitudinal sectional view of one of the picker fingers and operating mechanism illustrated in Fig. 2;

Fig. 4 is a vertical sectional view of one of the air motors for rotating the picker fingers, taken on line 4—4 of Fig. 3;

Fig. 5 is a view partly in section and partly in elevation of the receptacle or receiver for the picked cotton, and the air suction motor associated therewith;

Fig. 6 is a bottom plan view of said receptacle or receiver;

Fig. 7 illustrates the preferred type of picker finger and cooperating segmental cotton stripping collar;

Figs. 8 and 9 are detail views of the two forms of units comprising said collar;

Fig. 10 is an enlarged outer end view of the preferred form of picker finger;

Fig. 11 is a modification thereof;

Fig. 12 and 13 illustrate respectively sectional and end views of a modified form of picker finger of the air suction type.

Referring to the drawings in detail, the main support for the apparatus comprises a frame designated generally as 1, said frame being widest at its forward end and provided at this end with tractor wheels 2, suitably connected in any preferred manner to the main power plant or engine 3. The frame 1 converges towards the rear end thereof, which end is supported by a steering wheel 4, provided with any suitable type of steering gear 5.

Extending beyond the steering wheel 4, and secured to the main frame 1, are two platforms or steps 6, properly positioned to pass each side of the row of cotton plants during the operation of the machine, the purpose of which will be hereinafter more fully described.

Mounted upon the enlarged forward end of the main frame 1 is a receiver or receptacle 7, into which the picked cotton is drawn through conveyor pipes 8, from both the manually directed pickers 9 and the fixed pickers 10, the details of said receiver being more clearly shown in Fig. 5. It will be here noted that the receiver 7 is preferably cylindrical with a conical top and bottom and a central or main compartment 11 surrounded by an annular chamber 12, said main compartment being capped with a conical screen 13, which forms the only outlet for the air drawn into the chamber 11 through the conveyor pipes 8 by the suction pump 14 communicating with the annular chamber 12, which pump may be operated either by a pulley 3, Fig. 5, connected by belt (not shown) to the main power plant of the machine, or by compressed air directed through a pipe 16, from an air storage tank 17 mounted on the frame 1 adjacent the receiver 7 as clearly shown in Fig. 1. This air storage tank is supplied by an air compressor 18 provided with a belt and pulley drive 19, or similar arrangement, also driven by the main power plant 3. Aside from operating the air suction pump 14, the principal object of the tank 17 is to supply compressed air through the pipes 20 to the operating mechanism of the pickers 9 and 10, in a manner to be hereinafter described in detail. In Fig. 5 it will be noted that only two air conveyor pipes 8 are shown, which is merely representative, as it is to be understood that any number of these pipes are to be used according to the number of pickers employed.

It will also be noted, upon referring to Fig. 1, that for the purpose of clearness in illustration, only a few of the air conveyor pipes 8 to the receiver 7, and compressed air pipes 20 from the air compressor 17, are shown, but it will be apparent that there will be a compressed air pipe and a conveyor pipe for each picker.

Projecting outwardly from the forward end of the main frame 1 are two oppositely disposed parallel guides or deflectors 21, slightly flared and spaced apart sufficiently to straddle and gather up the lower or drooping cotton bolls, so that they will be in proper position to be engaged by the battery of fixed pickers 10, which are mounted in the vertical sides of said shield 21.

The details of the preferred form of picker are illustrated in Figs. 2 and 3, where it will be noted that said picker is of the multiple-needle, combined continuous rotary and reciprocating type. This picker comprises a pair of converging cylinders 22, the converging ends thereof being provided with a common mouthpiece or chamber 23. The rear or diverging end of each cylinder 22 is provided with an eccentrically mounted casing or the like 24, said parts being rigidly maintained in the position illustrated and described, by a bracket 25, embracing the intermediate portion of each of the cylinders 22.

The mouthpiece or chamber 23 has a rearwardly extending tubular portion 26, the rear end of which being positioned to be secured to the air conveyor pipe 8.

Mounted within each of the cylinders 22 is a picker needle 27, being provided at its rear end with an annular flange or collar 28. Surrounding the collar 28 is a hollow piston 29, said collar or annular flange 28 being maintained in its position by a retaining ring 30. The hollow portion 31 of the piston 29 provides a working cylinder for the flanged end 28 of the picker finger 27. Interposed, however, between the head of the cylinder and the annular flange 28 is a compression spring 32, normally maintaining the annular flange 28 against the retaining ring 30, yet permitting a limited rearward movement of the picker finger 27 relative to the piston 29. By this arrangement, a safety device is provided, so that in case the outer end of the picker finger 27, during its operation, should meet any obstruction or resistance, the cushioned effect obtained by the arrangement aforesaid will prevent the damage or breaking of said picker finger. The picker finger 27 is preferably square in cross section and the forward end thereof is mounted for sliding operation within a collar or the like, comprising two pairs of demountable segments 33 and 34, each of said segments being provided with a reduced portion 35 and 36 respectively. When these various segments are assembled in the position as best illustrated in Fig. 7, they are preferably maintained in said position by a contracting coil spring 37, by which arrangement any wear of said collar as assembled will be taken up by said spring 37. One of these collars, when assembled, is adapted to be rotatably mounted in the forward or convergent end of each of the cylinders 22 between annular flanged sections 38, in any preferred manner as clearly shown in Fig. 3. The length and relation of the picker needle 27 is such that, when said picker needle is in its extreme retracted position, the outer end thereof will be just within the outer face of the segmental collar and, by reason of this arrangement and construction, the cotton, as it is picked off by the picker finger, attaching itself thereto, is drawn back with said finger until it strikes the segmental collar above referred to, whereupon said collar will strip the cotton from the picker needle, permitting it to fall down within the mouthpiece 23, whereupon it is drawn by the air conveyor through the tubular extension 26 into the conveyor pipe 8, and from thence to the receiver 7.

As hereinbefore stated, the picker finger 27 is of the combined continuous rotary and reciprocatory type and, with the arrangement as above described, wherein two picker fingers are employed and mounted for operation in the converged cylinders 22, said picker fingers will be directed towards a common point, means being provided for alternately advancing and retracting said picker fingers. To provide for the rotary action of the picker fingers 27, the head of each of the pistons 29 mounted in their respective cylinders 22 has secured thereto a squared shaft section 39, forming a rearward extension of each of the picker fingers. Each of these shaft extensions 39 projects through the center of a rotor 40, provided with spring pressed vanes or blades 41, eccentrically positioned within each of the casings 24.

These casings 24 are provided with compressed air inlets 42 and air exhaust ports 43, whereby the compressed air from the storage tank 17 is directed through the pipe 20 into the casing 24, causing the proper rotation of the rotor 40 and a corresponding rotary movement of the picker finger 27. The rotary speed of the picker fingers 27 is controlled or governed by a valve 44, as shown in Fig. 2.

The reciprocatory movements of the picker fingers 27 are controlled by a valve 45, properly mounted to operate within an air chest 46, said chest being provided with a compressed air inlet 47, and alternately controlled passages 48 and 49. The passageway 48 is connected to pipes or conduits 50 and 51, pipe 50 conducting the compressed air to the foreward end of one of the cylinders 22, and pipe 51 to the rear end of the opposite cylinder 22. Similarly, the passageway 49 is provided with a pipe 52, running to the after end of the first mentioned cylinder 22, and a pipe 53, communicating with the forward end of the second mentioned cylinder 22. With this arrangement, and as shown in Fig. 3, when the valve 45 admits compressed air by way of the supply opening 47 through passageway 48 into the pipes 50 and 51, said compressed air will act upon the forward side of the piston 29 in the first mentioned cylinder 22, and on the after side of the similarly constructed piston in the second mentioned cylinder 22, so that one of the picker fingers 27 will be retracted and the cooperating picker finger will be projected. Conversely, when the slide valve 45 is moved to establish communication between the inlet port 47 and the passageway 49, the reverse action will be accomplished and a continuous sliding movement of the valve 45 back and forth will produce an alternating projection and retraction of the cooperating needles 27 in an obvious manner. To provide for the operation of the slide valve 45, said valve is constructed with a jointed stem or rod 54, the outer end of which being pivotally connected to a cross arm 55, pivotally mounted in a support 56 properly secured in rear of the casings 24. This cross arm 55 is preferably of tubular construction and telescoping within each end of said tube are rods 57 and 58, having their outer ends pivotally secured to the outer ends of the shaft extensions 39 of the picker fingers 27.

The compressed air entering the air chest 46 through the port 47 is supplied by a pipe 59 provided with a regulating valve 60, said pipe forming a branch of the compressed air supply pipe 20, hereinbefore referred to.

With the above described arrangement, it will be apparent that, upon the admission of compressed air through the valve 60 by way of pipe 59 into the air chest, the compressed air will be directed to the proper ends of the opposite cylinders 22 to project one picker finger and retract the other picker finger, at which time the cross arm 55 will be correspondingly oscillated and, by reason of the rod 54 connecting said cross arm with the slide valve 45, upon the limit of movement of the respective picker fingers in the opposite directions, the slide valve will be moved to uncover the opposite port to that first uncovered, so that the compressed air will be directed into the opposite ends of the respective cylinders 22 to cause a reverse reciprocating movement of the picker fingers 27, which alternating movement of the slide valve 45 controlling the movement of the picker fingers will be continuous as long as the valve 60 of the air supply pipe 59 remains open. It will also be apparent that the speed of the reciprocating action of the piker fingers 27 may be regulated by said valve 60.

The rotation of the picker fingers 27 is caused by the rotation of their respective rotors 40, eccentrically positioned in the casings 24, said rotors being operated by compressed air supplied through the pipe 20, past the valve 44 into the inlets 42 of the respective casings 24, said compressed air being discharged therefrom through the outlets 43. To permit the rotation of the shaft extensions 39, connected to their respective picker fingers, the connections between the outer ends of these shaft extensions and the telescoping rods 57 and 58, comprise collars 61, adapted to surround a cylindrical reduced end portion of the shaft extensions 39, said collars being held in position by cotter pins or any other suitable means.

By reason of the valves 44 and 60, it will be apparent that both the rotary and reciprocatory movements of the picker fingers may be regulated independently and irrespectively of each other, so that, if desired, the rotation of the picker needles may be increased and their reciprocating action decreased, or vice versa, according to working conditions.

The preferred construction of picker needles per se is illustrated in Figs. 7 and 10, whereby it will be noted that said picker needle is substantially square in cross section, the outer end thereof being constructed with prongs or the like 62, and to the left of each longitudinal corner edge thereof, a groove 63 is formed, providing working edges for said needle, assuming that the same is rotated in the direction of the arrow, as indicated in Fig. 10. In addition to the groove 63, each longitudinal edge of said picker finger is provided with a series of teeth or tangs 64, as clearly shown in the drawings, which will increase the gripping action of the picker finger during the operation thereof.

As hereinbefore stated, upon the retraction of the respective picker fingers, the cotton collected thereon will be stripped off by the segmental collar surrounding the outer end of the needle, and said picked cotton will be picked up by the air suction created in the mouthpiece 23, extension 26 and conduit 8, and from thence conveyed into the receiver or receptacle 7, the air suction being caused by the pump or the like 14. The pneumatic conveyor pipes 8 are preferably arranged around the upper end of the receiver 7, and the cotton drawn therethrough will be directed against the conical screen 13, and from there deflected downwardly into the bottom of the receptacle, all dirt and small foreign particles passing through the screen and out through the pumping apparatus, leaving the clean cotton within the receptacle. This receptacle is constructed with a hinged conical bottom 67, provided with projecting and retracting bolts or bars 68, the outer ends of which being positioned to engage and interlock with cam-faced catches or hook-like members 69. The lower or inner ends of the sliding bars 68 are connected to a disc or the like 70, said disc in turn being provided with a lever 71. With this arrangement, when the conical bottom is in its closed position, as illustrated, a turning movement of the lever 71 will cause a retraction or withdrawing of the bolts or bars 68, permitting the dropping of said bottom to discharge the contents of the receiver or receptacle 7. Conversely, when the conical bottom 67 is adapted to be maintained in its closed position, a reverse movement of the lever 71 will cause a projecting of the bolts 68 to properly engage the hooks or catches 69, in an obvious manner.

Fig. 11 represents a modified form of picker finger, in which the gripping action is obtained by outwardly projecting spring teeth 65, formed of wire or the like, the said teeth adapted to collapse, when the needle is retracted, within slots 66 formed in the side of the picker finger.

In Figs. 12 and 13, a pneumatic cotton picker is disclosed, operating entirely upon air suction, comprising an outer cylindrical head or the like 72, the outer end of which being provided with an annular flange 73, forming a central opening 74. The rear end of the cylinder 72 is provided with an interiorally disposed annular flange 75. Mounted between the flanges 73 and 75 is a tapered or cylindrical member 76, having its forward end constructed with an inwardly projecting flange 77, carrying an eccentrically positioned mouthpiece 78, said mouthpiece being provided with inwardly projecting teeth or tangs 79. In the assembled position of the tapered member 76 within the head or casing 72, sufficient space is left between the various cooperating flanges to permit the construction of raceways and the insertion of ball bearings or the like 81, so that the tapered member 76 may freely rotate within the head or casing 72.

Arranged within the tapered member 76 and properly secured therein is a spiral member 82, the purpose of which is to cause a rotation of the member 76 and its mouthpiece 78, so that, as the picker is directed close to the cotton bolls, the air suction created therein will draw the cotton within the mouthpiece 78 to be engaged and caught by the tangs 79, the continuous rotation thereof twisting the cotton from the bolls to be thereafter drawn in through the spiral 82 and from thence by way of the air conveyor 8 into the receiver 7, the suction rotating the spiral.

With this form of picker, the same will have to be directed very closely and almost in contact with the cotton bolls to properly function, and it is, therefore, not desirable as a mechanically operated picker and is therefore necessarily used as a manually directed picker.

In the apparatus, as illustrated in Fig. 1, the manually directed pickers 9 are illustrated as double-acting, multiple pickers, but the fixed pickers 10, arranged in the deflecting shields 21, are represented as double-acting, single pickers. This is only for the purpose of illustration, however, as it is to be understood that either single or multiple picker fingers can be independently used either as fixed or manually directed pickers.

From the foregoing description, it is believed the operation of the complete machine and the functioning of the various parts thereof will be perfectly obvious.

As the machine, straddling the cotton plants, passes down each successive row, the cotton bolls will first be engaged by the fixed pickers 10 mounted in the sides of the guides or deflectors 21, at which time said pickers 10 are operated by compressed air supplied thereto through the pipes 20, and the picked cotton conducted from the pickers to the receiver or receptacle 7 by the pneumatic conveyors 8. As the machine continues, any cotton that escapes the mechanical pickers 10 is recovered by the manually directed pickers 9, the men manipulating these last mentioned pickers taking their places on the platforms or steps 6.

These pickers are also operated by compressed air directed through the pipes 20 and similarly to the fixed pickers, the picked cotton is pneumatically conveyed through conduits 8 into the receiver 7, the necessary air suction being produced therein by the pump 14 in the manner hereinbefore described.

The machine also contemplates means for mounting thereon the receiver for the picked cotton and the compressed air storage tank together with the necessary air pumps for compressing the air and producing the air suction for the pneumatic conveying apparatus, said pumps being driven from the main power plant employed for propelling the machine.

What I claim is:—

1. In a cotton harvester, picker needles, means for producing a combined individual continuous rotary and reciprocatory action of each of said picker needles and means for regulating the relative reciprocatory and rotary speeds of said needles.

2. In a cotton harvester, the combination with multiple needles, of pneumatic means for producing a combined rotary and reciprocatory movement of said multiple needles and means for regulating the relative rotary and reciprocatory speeds of said picker needles.

3. In a cotton harvester, the combination with double acting, multiple picker needles, of means for causing a rotary movement of said picker needles, means for causing simultaneously a reciprocatory action of said needles, means for conducting compressed air to said needle operating means and means located in said air-conducting means for independently regulating the reciprocatory and rotary speeds of said picker needles.

4. In a cotton harvester, the combination with a picker comprising forwardly converging cylinders, of a piston for each cylinder, a picker needle operating in each cylinder having its rear end secured to one of said pistons, means for conducting compressed air into the cylinders and to the front and rear sides of the respective pistons to cause a retracting of one needle and a projecting of the other needle, and means for simultaneously rotating said needles.

5. In a cotton harvester, the combination with a picker, comprising a pair of forwardly converging cylinders, of a double acting piston for each cylinder, a picker needle operating in each cylinder having its rear end secured to the piston within that cylinder, a bearing in the outer end of each cylinder for supporting the forward end of said needle, a double acting valve for controlling the ports and conduits for conducting compressed air into the cylinder and to the front and rear sides of the respective pistons to cause a retracting of one needle and a projecting of the other needle, and means for simultaneously rotating said needles.

6. In a cotton harvester, the combination with a picker mechanism, of a picker needle means for producing a combined continuous rotary and reciprocatory action of said picker needle, and means for regulating the relative rotary and reciprocatory speeds of said needle.

7. In a cotton harvester, the combination with a picker mechanism, of a picker needle, a bearing supporting the end of said needle, forming a means for stripping the picked cotton from said needle, said bearing automatically compensating for wear between the cooperating parts.

8. In a cotton harvester, the combination with a picker mechanism, of a picker needle, a sectional bearing normally supporting and embracing the end of said needle, forming a means for stripping the picked cotton therefrom, and means for automatically contracting the sections of said bearing to closely embrace said needle at all times.

9. In a cotton harvester, the combination with a picker mechanism, of a picker needle, a sectional bearing normally supporting and embracing the end of said needle, forming a means for stripping the picked cotton therefrom, and means encircling said stripper for automatically contracting the sections of said bearing to closely embrace said needle at all times.

10. In a cotton harvester, the combination with a picker mechanism, of a picker needle, a bearing comprising interfitting sections for embracing and guiding said needle during the operation of the picker and also forming a means of stripping the picked cotton from said needle, and a coil spring encircling all of the sections of said bearing for automatically contracting the same to closely embrace said needle at all times.

In testimony whereof I affix my signature.

CLARENCE N. GOODWIN.